United States Patent Office 3,823,219
Patented July 9, 1974

3,823,219
METHOD OF PRODUCING GLASS REINFORCED PLASTIC ARTICLES
John E. Ward, Jr., Granville, and Bordie B. Garick, Newark, Ohio, assignors to Owens-Corning Fiberglas Corporation
No Drawing. Continuation of abandoned application Ser. No. 129,194, Mar. 29, 1971. This application Feb. 27, 1973, Ser. No. 336,134
Int. Cl. B29c 3/00; B29d 3/02; C08f 45/10; C08g 51/10; C08k 1/14
U.S. Cl. 264—331                                                    27 Claims

ABSTRACT OF THE DISCLOSURE

Glass fibers having a coating of plastic material thereon are coated with an ester of a polyglycol and an unsaturated fatty acid. The fibers are chopped, mixed with a matrix resin forming material and molded under sufficient heat and pressure to hydrolyze the lubricant coating.

---

This is a continuation of application Ser. No. 129,194, filed Mar. 29, 1971 and now abandoned.

BACKGROUND OF THE INVENTION

Glass fibers if drawn together without a protective coating there on will abrade each other, and once abraded will easily fracture when bent. It is imperative therefore that the glass fibers must be coated immediately after they are formed in order to prevent the fibers from being scratched during subsequent handling and processing. Where the fibers are to be used to reinforce a resin, the fibers must be coated with a material that is compatible with the resin to be reinforced. The glass fibers that are to be used for reinforcing resin therefore are coated with a resin which is compatible with the resin to be reinforced and this resin coating must be cured in order that the resin coating will not be sticky. Cured resins on the other hand have high coefficients of friction, and when the fibers are chopped, static charges cause the fibers to adhere to the material processing equipment. Heretofore coatings of a lubricant could not be used on the plastic coated fibers, since the film of lubricant separates the resin coating on the fibers and the resin to be reinforced, and prevents bonding therebetween, be it mechanical or chemical.

An object of the present invention is the provision of a new and improved process of treating and molding glass fiber reinforced plastics, in which an effective lubricating film is applied over plastic coated glass fibers, the fibers are mixed with a laminating resin and the laminating resin is cured, without appreciably decreasing the bond between the laminating resin and the fibers.

A further object of the invention is the provision of a new and improved process of the above described type wherein the lubricant is a fugitive lubricant and the laminating resin is cured under conditions which decomposes at least some of the lubricant into reactive elements.

A further object of the invention is the provision of a new and improved process of the above described type wherein the lubricant, although dry to the touch, holds sufficient water molecules bound thereto to effect hydrolysis of the lubricant during the curing process of the laminating resin.

A still further object of the invention is the provision of a new and improved process of the above described type wherein the resin coating on the fibers also hydrolyzes during the curing process of the laminating resin to an extent providing some reactive sites on the resin coating for bonding with the laminating resin.

Further objects of the invention will become apparent to those skilled in the art to which the invention relates from the following description of the preferred embodiments of the invention.

DESCRIPTION OF THE PREFERRED EMBODIMENTS

According to the invention, plastic coated glass fibers are coated with a lubricant, so selected that it will decompose under certain conditions to which it will later be subjected. The lubricant is also selected so that it will hold molecules of water loosely bound thereto, as by hydrogen bonds or other secondary bonds, which bonds are decomposed by heat. The fibers are chopped and mixed with a laminating resin to be reinforced by the fibers, and the laminating resin is cured under conditions which cause the loosely bound water to hydrolyze the lubricant so as to disrupt the lubricant film and permit the laminating resin to bond to the resin coating on the fibers. Preferably the resin coating on the fibers is also hydrolyzed during the process to a slight extent to produce reactive sites on the resin coated fibers. A preferred form of the lubricant is a polyglycol ester of an unsaturated fatty acid, or a polyoxyalkylene ester of an unsaturated fatty acid. Any resin having hydrolyzable groups can be used as a coating on the glass fibers. These resins will include polyvinyl acetate, polyvinyl chloride, polyesters having unused acid or alcohol groups, polyamides, aldehyde condensates, etc. The laminating resin can be any heat deformable resin, since the products of decomposition of the lubricant will create materials which bond to the resin on the fibers and these will in turn mechanically interlock with the laminating resin. The laminating resin however preferably has unsaturated bonds for producing a chemical bond to the unsaturate portion of the lubricant molecule.

EXAMPLE 1

A size was prepared from the following materials:

| Material: | Percent by Weight |
|---|---|
| Polyvinyl acetate water emulsion (55% solids) | 17.0 |
| Gamma amino propyltriethoxysilane | 0.2 |
| Polyvinylpyrrolidone | 0.125 |
| Water | Balance |

816 glass fibers having a diameter of approximately 0.00050 inch were coated with the size given above, and the fibers were drawn into a strand which was coiled into a package. The package was dried in an oven at 265° F. for 12 to 18 hours to remove the water and fuse the resin into a tightly adhering coating on the fibers.

The strand was removed from the package and passed over a roll applicator which applied a 2% solution of polyoxyethylene glycol monooleate in water to completely coat the strand and following which the wetted strand was fed to a chopper which cut the strand into ¼ inch lengths. The ¼ inch chopped strand was collected on a conveyor which transferred the chopped fibers through an oven having a temperature of 450° F. and the fibers were exposed to this temperature for 1 minute.

A catalyzed resin mix was made from the following materials:

| Material: | Parts by Weight |
|---|---|
| Polyester resin (1 mol phthalic anhydride, 1 mol maleic anhydride, 2 mols propylene glycol cooked to an acid number of 35) | 20.11 |
| Tertiary butyl perbenzoate | .132 |
| Benzoyl peroxide | .06 |
| Zinc stearate | .80 |

A resin premix for molding is made from the above resin using the following ingredients:

| Ingredients: | Parts by Weight |
|---|---|
| Above catalyzed resin mix | 17.63 |
| Calcined Kaolin clay filler | 3.15 |
| Calcium Carbonate | 28.32 |
| ¼ inch chopped strands given above | 10.80 |

The premix is made by charging the resin to a Baker-Perkins sigma blade type mixer and adding thereto the two fillers, followed by the chopped strands, and mixing the chopped strands into the mixture for one minute.

The above premix is extruded into cylinders of the proper weight for producing a 1/10 inch thick sheet between matched metal dies which are heated to a temperature of 300° F. and ten molded sheets were made using a molding pressure of 500 pounds per square inch.

Each molded sheet was cut into four test samples ½ inch wide and 8 inches long, and ten samples were tested for dry flexural strength according to the ASTM Specification D-790-66 and found to have a strength of 12,400 pounds per square inch. Ten samples were given a notched Izod impact strength test according to the ASTM Specification D-256 and were found to have an average strength of 4.15 foot pounds.

By way of comparison, molded samples were made using the procedure given above excepting that no coating of the polyoxyethylene glycol monooleate was used and these samples gave a flexural strength of 11,050 pounds per square inch, and an Izod impact strength of 2.66 foot pounds.

EXAMPLE 2

A size is made of the following materials:

| Material: | Percent by Weight |
|---|---|
| Glacial acetic acid | 1.2 |
| Lubricant (reaction product of tetraethylene pentamine and pelargonic acid) | 0.19 |
| Lubricant (reaction product of tetraethylene pentamine and caprylic acid solubilized with acetic acid) | 0.08 |
| Homopolymer of polyvinyl acetate | 12.9 |
| Gamma amino propyl triethoxysilane | 1.0 |
| Carbowax 1000 (polyethylene glycol 1000 mol-wt.) | .225 |
| Deionized water | Balance |

816 glass fibers of the type described in Example 1 above were sized with the polyvinyl acetate size given above and dried using the procedure given in Example 1 above. This material was drawn through a water solution of the polyethylene glycol monooleate as given above and chopped into ¼ inch lengths. The chopped strand was fed to the extruder by a vibrator, and the material advanced up the vibrator without producing static electricity and without balling by reason thereof.

A mixture of 20% by weight of the chopped fibers were mixed with a flaked polystyrene laminating resin having an approximate molecular weight of 230,000. The mixture was fed to an injection molding machine heated to a temperature of 400° F. and extruded into a section that was approximately ⅛ inch thick. Samples were made and tested in the manner given in Example 1. The samples had an average tensile strength of 12,160 pounds per square inch, and an Izod impact strength of 2.80 foot pounds.

The process was repeated excepting that the strand was not given a coating of the polyethylene glycol monooleate, and the test samples prepared therefrom had a tensile strength of 11,840 pounds per square inch and Izod impact strength of 2.84 foot pounds.

EXAMPLE 3

The process of Example 2 was repeated excepting that a polypropylene having a molecular weight of approximately 200,000 was substituted for the polystyrene and the test samples so prepared, had a tensile strength of 8,300 pounds per square inch and an Izod impact strength of 3.73 foot pounds. When the strand was not coated with polyethylene glycol monooleate, it had a tensile strength of 8,190 pounds per square inch and an impact strength of 3.83 foot pounds.

EXAMPLE 4

A size is made of the following materials:

| Material: | Percent by Weight |
|---|---|
| Glacial acetic acid | 0.040 |
| Lubricant (reaction product of tetraethylene pentamine and pelargonic acid) | 0.19 |
| Lubricant (reaction product of tetraethylene Pentamine and pelargonic acid) | 0.054 |
| Unsaturated Polyester Resin (1 mol phthalic anhydride, 1 mol maleic anhydride, 2 mol propylene glycol cooked to an acid number of 32-35 and solubilized with 1% of a condensate of propylene oxide and propylene glycol) Pluronic F77 | 17.456 |
| Glycidoxy propyl trimethoxysilane | 0.400 |
| Deionized water | 81.924 |

816 glass fibers of the type described in Example 1 above were sized with the polyester size given above and were dried using the procedure given in Example 1. This strand was coated with a 10% solution of polyethylene glycol monooleate. This coated strand was chopped, dried, mixed with the polyester resin given in Example 1 and tested all according to the procedure given in Example 1. The specimens so prepared had a tensile strength of 12,300 pounds per square inch, a flexural strength of 24,600 pounds per square inch, and a notched Izod impact strength of 8.27 foot pounds.

Test samples prepared in the same manner excepting that the strand was not coated with the 10% solution of the polyethylene glycol monooleate gave a tensile strength of 12,700 pounds per square inch, a flexural strength of 26,900 pounds per square inch, and a notched Izod impact strength of 9.53 foot pounds. The process given above was repeated excepting that the strand was coated with a 10% solution of oleic acid, and the test specimens prepared had tensile strength of 12,600 pounds per square inch, a flexural strength of 23,100 pounds per square inch, and a notched Izod impact strength of 9.14 foot pounds. From the above tests it is apparent that the lubricant which was used for chopping, distributing, and extruding the fibers, did not interfere appreciably with the strength of the product produced, and in some instances actually increased the strength. By way of comparison, molded articles made from strand coated with a 2% solution of zinc stearate have strengths only approximately 50% of the products coated with polyethylene glycol monooleate.

In general, the molding pressures used should be greater than the pressure of saturated steam corresponding with the molding temperatures used, and preferably above 35 p.s.i. The temperatures should be greater than approximately 280° F., preferably above 300° F. and most preferably above 325° F. As stated above, the polyethylene glycol monooleate is believed to hydrolyze at these temperatures and pressures to polyethylene glycol and oleic acid. Hydrolysis is a time rate function and preferably these molding temperatures and pressures should be held for more than 2 minutes and preferably more than 5 minutes. In the case of the polyvinyl acetate coated fibers, the evidence is that the acetate radicals on the polyvinyl back bone are hydrolyzed to some extent to create reactive sites for condensation with the oleic acid, and/or acid radicals of the polyester resin. The oleic radical in turn has unsaturated groups for cross-linking with the polyester laminating resin. In any event the polyethylene glycol monooleate appears to be broken up by the hydrolysis process and displaced so that it does not interfere with the bonding of the laminating resin to the resin coating on the fibers, regardless of the chemical composition of the resin coating on the fibers.

It is obvious that any polyglycol ester of any unsaturated fatty acid will operate similarly, since the polyglycol portion of the molecule will hold loosely bound water molecules thereto for the hydrolysis process during the molding operation and the unsaturated fatty acid portion will cross-link, to the laminating resin during the molding process.

While the invention has been described in considerable detail, we do not wish to be limited to the particular embodiments shown and described and it is our intention to cover hereby all novel adaptations, modifications and arrangements thereof which come within the practice of those skilled in the art to which the invention relates.

We claim:

1. In the process of producing glass fiber reinforced plastic articles wherein short lengths of glass fibers having a thermoplastic and/or thermosetting organic resin coating thereon are mixed with a compatible thermoplastic and/or thermosetting resin matrix forming material and the mixture is molded and heated under pressure to integrate the matrix material around the resin coated fibers and form a reinforced plastic article, the improvement comprising: coating the organic resin coated glass fibers with an aqueous solution of an unsaturated fatty acid ester of a polyglycol fugitive processing aid, permitting said ester coating on the fibers to hydrogen bond with the water molecules present, mixing said coated fibers with said resin matrix forming material, and molding the mixture under heat and pressure to hydrolyze at least some of the ester molecules on the fibers and to break up the lubricant coating so that bonding of the organic resin coated fibers to the matrix material is not appreciably impaired.

2. The process of claim 1 wherein the hydrolysis which occurs during said molding step causes said ester coating to break up to permit bonding between the organic resin coated glass fibers and the resin matrix.

3. The process of claim 1 wherein said organic resin coating on the fibers is a material which also is hydrolyzed at least to some extent by the heat and pressure of said molding step.

4. The process of claim 1 wherein said fibers are chopped into short lengths while wet before the mixing step.

5. The process of claim 1 wherein said molding step is accomplished using more than approximately 280° F. and more than thirty-five pounds per square inch pressure.

6. The process of claim 5 wherein said organic resin coating comprises a polyvinyl acetate.

7. The process of claim 5 wherein said organic resin coating comprises a polyester resin.

8. The process of claim 6 wherein said matrix forming material is a polyester resin.

9. The process of claim 8 wherein said unsaturated fatty acid ester of a polyglycol is a polyethylene glycol monooleate.

10. In the process of producing glass fiber reinforcements for plastic articles wherein the glass fibers are in short lengths having a thermoplastic and/or thermosetting organic resin coating thereon and wherein the glass fibers are mixed with a compatible thermoplastic and/or thermosetting resin matrix forming material and wherein the mixture is molded and heated under pressure to integrate the matrix material around the resin coated fibers and form a reinforced plastic article, the improvement comprising: coating the resin coated fibers with an aqueous solution of an unsaturated fatty acid ester of a polyglycol processing aid, said ester coating on the fibers hydrogen bonding to the water molecules present, chopping the coated fibers into uniform short lengths, mixing the chopped fibers with the resin matrix forming material, and molding the mixture under heat and pressure to hydrolyze at least some of the ester molecules on the fibers and break up the ester coating, thereby substantially abating the ester coating from interferring or inhibiting bonding between the resin coating on the glass fibers and the resin matrix forming material.

11. The process of claim 10 wherein said resin coating on the fibers is a material which also is hydrolyzed to at least some extent by the heat and pressure of said molding step.

12. The process of claim 10 wherein said fibers are chopped into short lengths while wet before the mixing step.

13. The process of claim 12 wherein said molding step is accomplished using more than approximately 280° F. and more than thirty-five pounds per square inch pressure.

14. The process of claim 13 wherein said organic resin coating comprises a polyvinyl acetate.

15. The process of claim 13 wherein said organic resin coating comprises a polyester resin.

16. The process of claim 14 wherein said resin forming material is a polyester resin.

17. The process of claim 16 wherein said unsaturated fatty acid ester of a polyglycol is a polyethylene glycol monooleate.

18. The process of claim 1 wherein said matrix forming material is a thermoplastic resin.

19. The process of claim 18 wherein said thermoplastic is polypropylene.

20. A glass fiber reinforced plastic article produced in accordance with the method of claim 1.

21. In the process of producing short lengths of glass fibers from continuous glass fibers having a thermoplastic and/or thermosetting organic resinous coating thereon, and which short lengths of glass fibers are used as a reinforcing material for thermoplastic and/or thermosetting resin matrix forming materials, the improvement comprising: applying a water solution of an unsaturated fatty acid ester of a polyglycol to continuous glass fibers having said thermoplastic and/or thermosetting organic resinous coating thereon, chopping said continuous fibers into short lengths while the continuous fibers are still wet with said water solution of an unsaturated fatty acid ester of a polyglycol, drying said wet fibers while leaving sufficient water molecules to be hydrogen bonded to said unsaturated fatty acid ester of a polyglycol, so that the molecules of the ester can hydrolyze at the temperatures used to mold the matrix forming materials and whereby the coating will be disrupted and prevented from interfering with the bonding of the fibers to the matrix forming material when the fibers are combined with a resin matrix and the mixture is molded under heat and pressure.

22. The process of claim 21 wherein said unsaturated fatty acid ester of a polyglycol is a polyethylene glycol monooleate.

23. The process of claim 21 wherein said organic resinous coating material on the fibers is a material which hydrolyzes at least to some extent under the same conditions which hydrolyzes said unsaturated fatty acid ester of a polyglycol.

24. The process of claim 21 wherein said step of removing free liquid water is performed by drying in an oven at elevated temperatures.

25. The process of claim 23 wherein said organic resinous coating material comprises a polyvinyl acetate.

26. The process of claim 23 wherein said organic resinout coating material is a polyester resin.

27. The process of claim 25 wherein said unsaturated fatty acid ester of a polyglycol is a polyethylene glycol monooleate.

References Cited

UNITED STATES PATENTS

| | | | |
|---|---|---|---|
| 2,877,501 | 3/1959 | Bradt | 264—328 X |
| 3,022,210 | 2/1962 | Philipps | 260—41 AG X |
| 3,416,990 | 12/1968 | Robinson | 260—41 AG X |
| 3,635,879 | 1/1972 | Baer et al. | 260—41 AG X |
| 3,650,818 | 3/1972 | Marzocchi et al. | 260—41 AG X |
| 3,654,219 | 4/1972 | Boyer et al. | 260—41 AG X |

OTHER REFERENCES

Morrison, Robert Thornton, and Robert Neilson Boyd, "Organic Chemistry," second edition. Boston, Mass., Allyn and Bacon, 1966, pp. 672–679.

PHILIP E. ANDERSON, Primary Examiner

U.S. Cl. X.R.

117—72, 124 E, 170; 260—18 R, 31.6, 41 AG; 264—174, 176 R, 328, Dig. 53